United States Patent [19]
Wei

[11] Patent Number: 6,151,370
[45] Date of Patent: Nov. 21, 2000

[54] PATH-ORIENTED DECODER FOR SIGNAL-DEPENDENT NOISE

[75] Inventor: Lee-Fang Wei, Lincroft, N.J.

[73] Assignee: Lucent Technologies Inc., Murray Hill, N.J.

[21] Appl. No.: 09/023,063

[22] Filed: Feb. 12, 1998

[51] Int. Cl.[7] .............................. H04L 27/06; H04L 23/02
[52] U.S. Cl. .......................... 375/341; 375/262; 714/795
[58] Field of Search .................................... 375/341, 262; 714/795

[56] References Cited

U.S. PATENT DOCUMENTS

| | | | |
|---|---|---|---|
| 5,056,117 | 10/1991 | Gitlin et al. | 375/234 |
| 5,432,821 | 7/1995 | Polydoros et al. | 375/340 |
| 5,872,817 | 2/1999 | Wei | 375/341 |
| 5,905,742 | 5/1999 | Chennakeshu et al. | 375/222 |
| 6,012,161 | 1/2000 | Ariyavisitakul et al. | 714/795 |

OTHER PUBLICATIONS

Stefan A. Fechtel and Heinrich Meyr, "M–Algorithm Combined Equalization and Decoding for Mobile / Personal Communications", IEEE International Conference of Communications, ICC '95 Seattle, vol. 3, pp. 1818–1821.

G. D. Forney, Jr., "The Viterbi Algorithm," Proceedings Of the IEEE, vol. 61, pp. 268–278, Mar. 1973.

A. Duel–Hallen and C. Heegard "Delayed Decision–Feedback Sequence Estimation," IEEE Transactions on Comm., vol. 37, pp. 428–436, May 1989.

P. R. Chevillat and E. Eleftheriou, "Decoding Of Trellis–Encoded Signals In The Presence of Intersymbol Interference And Noise," IEEE Trans on Comm., vol. 37, pp. 669–676, Jul. 1989.

M. V. Eyuboglu and S. U. H. Qureshi, "Reduced–State Sequence Estimation For Coded Modulation On Intrersymbol Interference Channels," IEEE Journal on Selected Areas in Comm., vol. 7, pp. 989–995, Aug. 1989.

S. Mohan and A. K. Sood, "A Multiprocessor Architecture For The (M, L)–Algorithm Suitable For VLSI Implementation," IEEE Trans. on Comm., vol. 34, pp. 1218–1224, Dec. 1986.

F. K. Soong and E. F. Huang., "A Tree–Trellis–Based Fast Search For Finding The N Best Sentence Hypotheses In Continuous Speech Recognition," ICASSP 91. International Conf. on Acoustics, Speech and Signal Processing, pp. 705–708, 1991.

N. Seshadri and C.–E. W. Sundberg, "List Viterbi Decoding Algorithms With Applications," IEEE Transactions on Communications vol. 42, pp. 313–323, Feb./Mar./Apr. 1994.

*Primary Examiner*—Stephen Chin
*Assistant Examiner*—Paul N. Rupert
*Attorney, Agent, or Firm*—Geraldine Monteleone; Jeffrey M. Weinick

[57] ABSTRACT

A path-oriented approach is provided to determine surviving paths in a decoder. The paths that are retained as the surviving paths are some number, M, of the paths which have the smallest path metrics, even if two or more of those paths come into a given state. This approach provides significantly improved performance in at least those applications in which branch metrics are a function of the surviving path from which the branch emanates.

24 Claims, 6 Drawing Sheets

6,151,370

PATH-ORIENTED DECODER FOR SIGNAL-DEPENDENT NOISE

TECHNICAL FIELD

This invention relates to the decoding of digital information transmitted over a communication channel with signal-dependent noise, such as intersymbol interferences.

BACKGROUND OF THE INVENTION

Viterbi decoders are well known in the art as maximum likelihood decoders which can be used in systems that employ error correcting codes, such as convolutional codes, trellis codes, and a variety of other codes, all of which can be generally characterized by a so-called trellis. The basic concept of the Viterbi decoder can be described as correlating all possible transmitted sequences with the received sequence and then choosing as the "best" or "maximum likelihood" path the sequence whose correlation is maximum.

In particular, the trellis encoder in a transmitting modem proceeds through a sequence of so-called states which, in turn, defines a corresponding sequence of signal point subsets of a signal constellation. Indeed, a feature of trellis coding is that, at any point in time, only the points in particular subsets of the constellation are allowed to be transmitted, depending on the state of the trellis encoder.

A trellis associated with the particular trellis code being utilized by the modem consists of a sequence of concatenations of a so-called trellis diagram, or state transition diagram. The trellis diagram defines, for each code state, which next state or states the encoder is allowed to transition to. The allowable transitions from one state to a next, subsequent state are limited. Each such transition is associated with one of the constellation subsets, such that when the encoder transitions from a particular current state to one of the allowed next states, a signal point will be output by the transmitter which is taken from the subset associated with that state transition. Each possible transition from one state to a next state is called a branch. Each branch, therefore, corresponds to a subset. A sequence of signal points selected from a sequence of interconnected branches is called a path through the trellis.

The transmitted signal points are displaced in signal space due to noise and channel-induced distortion, and the receiver uses the Viterbi decoder, operating on the received version of the transmitted signal points, to perform the aforementioned maximum likelihood sequence detection. Based on the received version of the transmitted signal points and the knowledge of the trellis code used by the encoder, the Viterbi decoder determines the most likely sequence of signal points that was actually transmitted. The decoder performs this function by forming a tentative decision as to what was the most likely transmitted signal point that would have caused the encoder to transition into a next state of the code. These tentative decisions are signal points along the so-called "surviving paths" which are certain paths through the trellis.

More particularly, the Viterbi decoder forms the surviving paths by keeping track of so-called "metrics". A branch metric, a function of the received version of the signal point, is calculated for each current-to-next-state transition associated with each branch in the trellis diagram. More particularly, the branch metric for each branch is determined by the distance between the received signal point and the closest signal point in the subset associated with that branch. Every path through the trellis which leads into a state has an associated path metric which is a function of the sum of the branch metrics for the branches that make up that particular path. Further, a path entering a current state may be extended through the trellis and enter a next state by including a branch representing an allowed transition from the current state to the next state. The path metric for such an extended path is a function of the sum of (a) the path metric associated with the path as it entered the current state and (b) the branch metric associated with the included branch.

The decoder compares the path metrics of the different paths entering a state and retains as one of the aforementioned surviving paths the path with the smallest path metric. All other paths entering that state are discarded. The surviving paths are used by the decoder to make a final decision as to the value of an earlier transmitted signal point.

Prior to being applied to the Viterbi decoder, each received signal point is typically processed to compensate, at least to some extent, for the aforementioned channel impairments. It is well known, for example, to use a so-called feedforward equalizer to remove at least a portion of the so-called intersymbol inteference ("ISI") component of the received signal. The ISI-compensated signal point is then used in calculating the branch metric for each branch. Although feedforward equalizers work well for channels in which the ISI is relatively mild, severe ISI is typically more effectively compensated for using a so-called decision feedback equalizer ("DFE"). Such an equalizer generates an estimate of the ISI component of a received signal point as a function of decisions as to the values of previously received signal points. As noted above, the nature of Viterbi decoding is such however that those decisions have not yet been made at the time that the ISI estimate is needed. U.S. Pat. No. 5,056,117 issued to Gitlin et al. addresses this issue. In the joint DFE/Viterbi decoder disclosed therein, a separate DFE is provided for each surviving path and the "decisions" used by each DFE are the aforementioned tentative decisions along that surviving path.

SUMMARY OF THE INVENTION

It will be appreciated from the foregoing that each branch metric in the joint DFE/Viterbi decoder arrangement shown in the above-cited '117 patent is not only a function of the received signal point but also of the surviving path from which the branch in question emanates. The present invention is directed to a technique which provides significantly improved decoding in at least those applications in which that is the case.

In accordance with the invention, the paths that are retained as the surviving paths in a decoder are some number, M, of the paths which have the smallest path metrics, even if two or more of those paths come into a given state. The value of M can be as few as two and as large as desired. M can even be larger than the number of code states, as long as the resulting level of implementational complexity is acceptable. I have discovered that, at least in the above-mentioned type of applications, this decoder, referred to herein as a "path-oriented" decoder, will provide a better error rate performance than the above-described prior art "state-oriented" Viterbi decoder for a comparable level of decoder complexity. Alternatively, a comparable level of error rate performance can be achieved with a lower level of decoder complexity.

Thus, contrasting the invention with the prior art, it will be recalled that in the state-oriented Viterbi decoder of the prior art, for every successive signal point received by the Viterbi decoder, there is only one surviving path for a state-namely the so-called "candidate path" entering that state with the smallest path metric. On the other hand, in the path-oriented decoder of the present invention, for every successive signal point received by the decoder, the surviving paths are those among all candidate paths with the smallest path metrics, regardless of the states the surviving paths are entering. That is, it is possible under this approach to retain more than one path entering any one particular state or none of the paths entering that state.

The invention may also be contrasted with prior art where, in order to reduce decoder complexity, a reduced-state state-oriented Viterbi decoder is used in which the surviving paths leading into only a reduced number of states are retained. In particular, once the surviving path into each state has been determined and all other paths discarded, only a certain number of the one-per-state surviving paths are retained. Thus, such arrangements, unlike the present invention, do not select as the surviving paths the paths with the lowest path metrics overall, but rather continue to incorporate the prior art approach of selecting as at least a potential surviving path the path with the lowest path metric entering each state.

DETAILED DESCRIPTION

Figure 1:
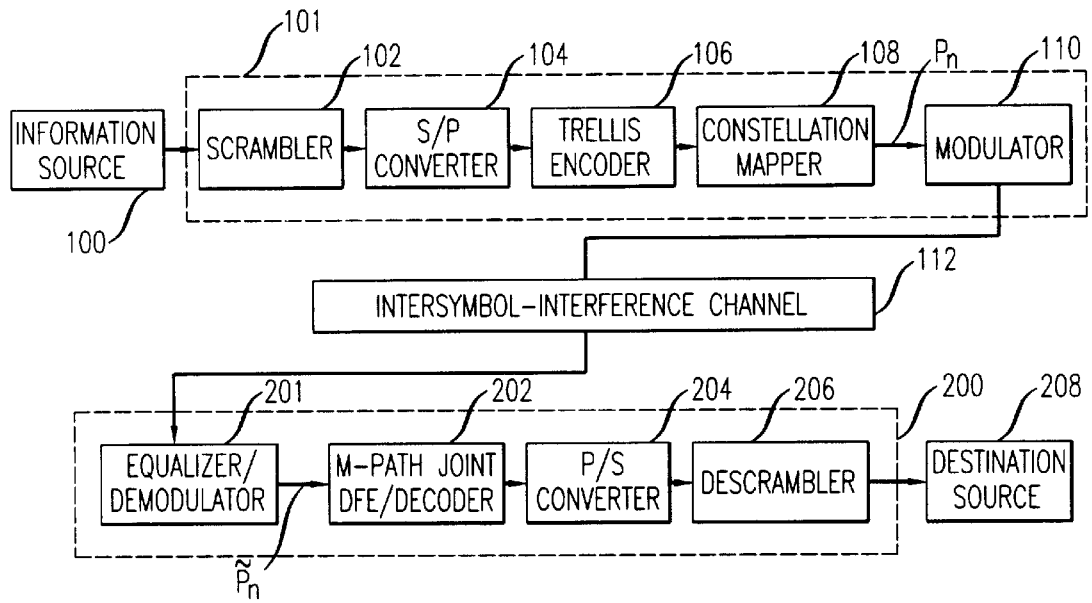
FIG. 1 shows a generalized block diagram of a communication system in which the present invention is illustratively used.

A model of a communication system in which the invention is illustratively used is shown in FIG. 1. A sequence of bits generated from an information source 100 (such as a PC or computer terminal) is input to a transmitting modem 101 and, in particular, to a scrambler 102 thereof, which randomizes the bits in a conventional manner. The serial bit stream output from scrambler 102 is provided to a serial-to-parallel (S/P) converter 104. The bits provided in parallel at the output of converter 104 are applied to trellis encoder 106, which processes them in a manner to be described and provides a number of trellis encoded output bits to constellation mapper 108.

Figure 3:
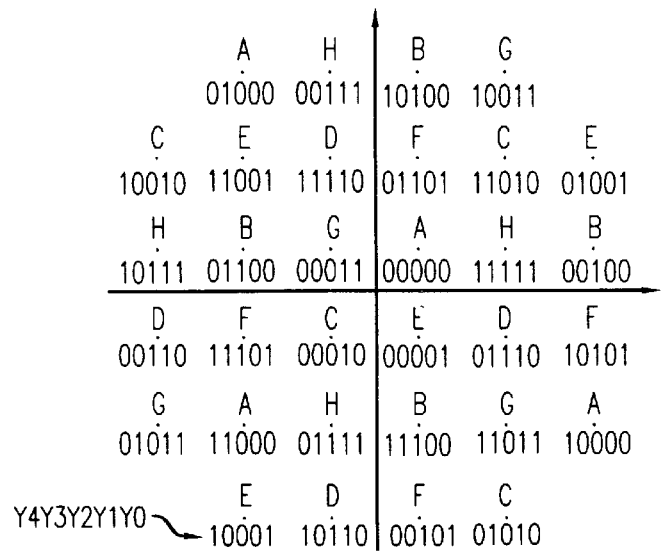
FIG. 3 shows an illustrative thirty-two signal point constellation.

As described in further detail hereinbelow, constellation mapper 108 provides channel signal points $P_n$ to a modulator 110 by selecting the signal points from a predetermined constellation of signal points such as the constellation of FIG. 3. In particular, constellation mapper 108 uses a portion of the output bits—illustratively, Y2Y1Y0—from trellis encoder 106 to select a subset of the points of the signal constellation, such as the signal points labeled "A" in FIG. 3, and uses the remaining output bits—illustratively, Y4Y3—to select a signal point from the selected subset, such as the signal point associated with the bit pattern 01000. The selected signal point is provided to conventional pulse-shaping filter (not shown) and then to modulator 110. Modulator 110 modulates the sequence of selected signal points and provides a modem output signal onto a communication channel 112.

In channel 112 the transmitted signal is subjected to intersymbol interference ("ISI"). It is also corrupted by so-called additive Gaussian noise. The resulting noise- and ISI-corrupted signal is ultimately delivered to receiving modem 200.

Within receiving modem 200, the received signal is processed in a conventional manner by equalizer/demodulator 201 to generate a corrupted signal point $\hat{P}_n$ from which some of the intersymbol interference—principally the so-called precursors—has been removed. Signal point $\hat{P}_n$ is then processed by M-path joint DFE/Viterbi decoder 202 to further equalize the signal—principally to remove so-called postcursors—and to decode the signal to recover the transmitted signal point. Decoder 202 utilizes the decoding technique of the present invention as described in detail hereinbelow. At this point, decoder 202 provides a final decision $\hat{P}_{n-D}$ as to the value of a signal point transmitted D signal points earlier. The output of decoder 202, comprising the data bits corresponding to $\hat{P}_{n-D}$, is provided to a parallel-to-serial (P/S) converter 204, descrambled in a conventional manner by a descrambler 206, and received by destination source 208 (which may be, for example, a mainframe computer or another PC).

Figure 2:
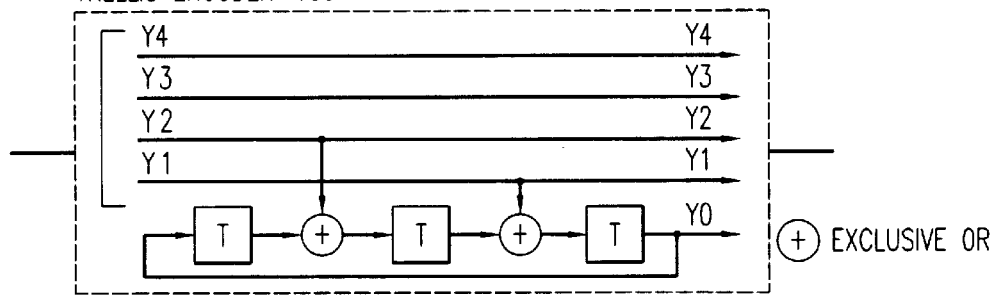
FIG. 2 shows an illustrative embodiment for a trellis encoder used in the communication system of FIG. 1.

FIG. 2 is an illustrative implementation of trellis encoder 106. The input to trellis encoder 106 from S/P converter 104 comprises the four data bits Y1 through Y4 received during a so-called signaling interval of duration T. Trellis encoder 106 is illustratively a systematic encoder, meaning that each of its input data bits passes through the encoder unchanged to become one of its output bits. Trellis encoder 106 has one additional output bit Y0—which is the so-called redundant bit. In particular, encoder 106 is a finite-state machine in which the encoder state is defined by the bit values currently stored in the three T-second delay elements. As seen from the FIG., the value of bit Y0 is a function of the current encoder state and the values of the current input data bits Y1 and Y2.

To this end, the three T-second delay elements are interconnected through two exclusive-OR gates as shown. Since each of the three delay elements can contain a binary "0" or "1" at any point in time, the trellis encoder has 8 ($=2^3$) so-called states and indeed is referred to as an 8-state encoder. As each new set of values of Y1 and Y2 arrives for each new signaling interval, the bit values stored in the delay elements are updated, thereby advancing, or transitioning, the encoder to a new state. This process is repeated for a succession of signaling intervals, with the encoder transitioning through a sequence of states.

The values of bits Y0 through Y4 determine which signal point of a predetermined 32-signal-point constellation should be transmitted as signal point $P_n$. That constellation is the one shown in FIG. 3. The constellation is comprised of eight signal point subsets A through H, each in turn comprised of four signal points as shown. The values of bits Y0 through Y2 identify which of the eight subsets signal point $P_n$ is to be taken from. The values of bits Y3 and Y4 select as $P_n$ a particular one of the four signal points within the identified subset. The structure of encoder 106 is such that not all sequences of states can actually occur. As a result, not all sequences of the three-bit combination Y2Y1Y0 can actually occur. The overall consequence is that the signal points of the constellation of FIG. 3 are allowed to be taken only from certain sequences of subsets. This constraint is what gives rise to a trellis-coded system's enhanced immunity to noise and other channel impairments.

Figure 4:
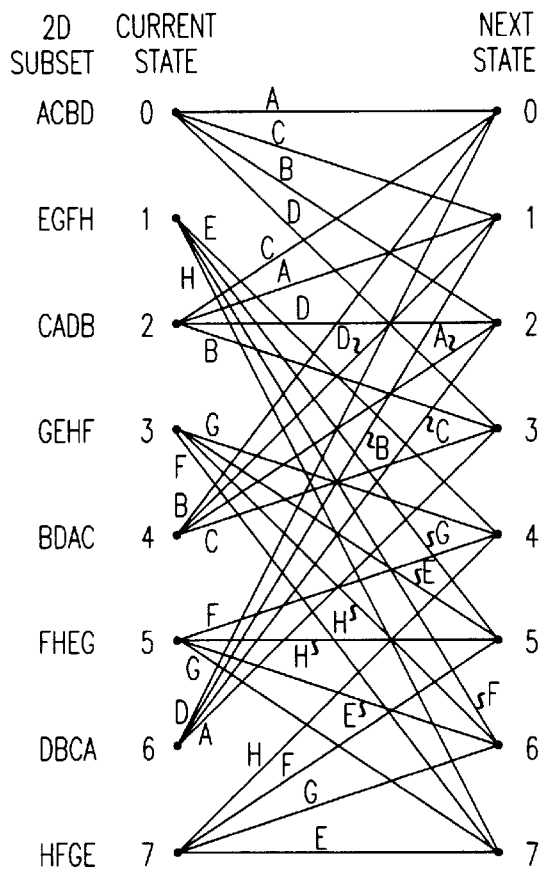
FIG. 4 shows a trellis diagram that represents the operation of the trellis encoder of FIG. 2.

The trellis diagram of FIG. 4 illustrates the operation of trellis encoder 106 from another perspective. The eight states of the trellis encoder 106 are denoted 0 through 7. The two vertical lines of points in FIG. 4 respectively represent the possible current and next encoder states. The trellis diagram defines, for each current encoder state, which next states the encoder is allowed to transition to. The lines, or branches, connecting various pairs of states indicate the allowed state transitions. For example, the encoder can transition from current state 0 to any one of next states 0, 1, 2 or 3 but not to any other state.

Every branch in FIG. 4 bears a label indicating which of subsets A through H the signal point being generated is to come from. Assume that the current state of the encoder is 0 and that, after receiving a new pair of input bits Y1 and Y2, the encoder is now in state 1. This means that the next signal point to be output is to come from subset C since the line connecting state 0 in the left column to state 1 in the right column is labeled C. With the encoder now in state 1 (the new current encoder state), the encoder can transition to any of states 4, 5, 6 or 7, and thus the next signal point is constrained to come from one of the subsets E, G, F, or H, depending on which state the encoder has transitioned to.

Figure 5:
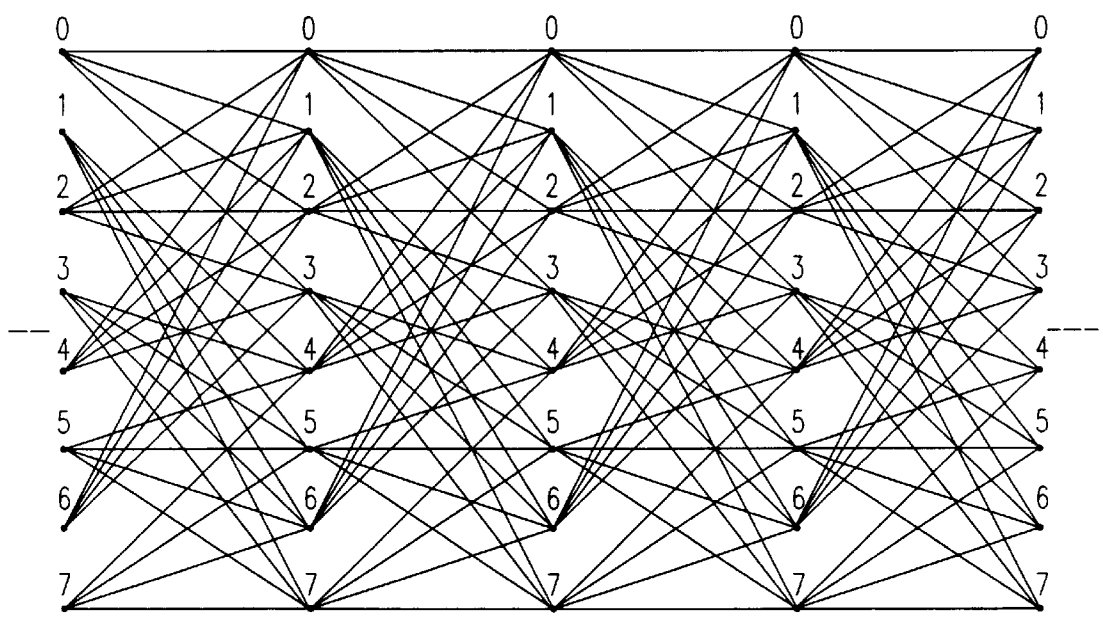
FIG. 5 shows a portion of the trellis corresponding to the trellis diagram of FIG.4.

As discussed earlier, a sequence of concatenations of trellis diagrams associated with a particular trellis code comprises a trellis. For example, FIG. 5 shows a portion of the trellis corresponding to the trellis diagram of FIG. 4. In particular, FIG. 5 represents four successive state transitions of the trellis encoder. The branches represent the possible transitions of the encoder from a current to a next encoder state. A sequence of signal points selected from any sequence of interconnected branches is a so-called path through the trellis.

As noted earlier, joint DFE/decoder 202 in receiver 200 subjects the received signal point $\tilde{P}_n$ to decision feedback equalization prior to performing its decoding. FIGS. 6 through 9 show the ways in which a joint DFE/decoder is implemented in the prior art and, by contrast, pursuant to the principles of the present invention.

Figure 6:
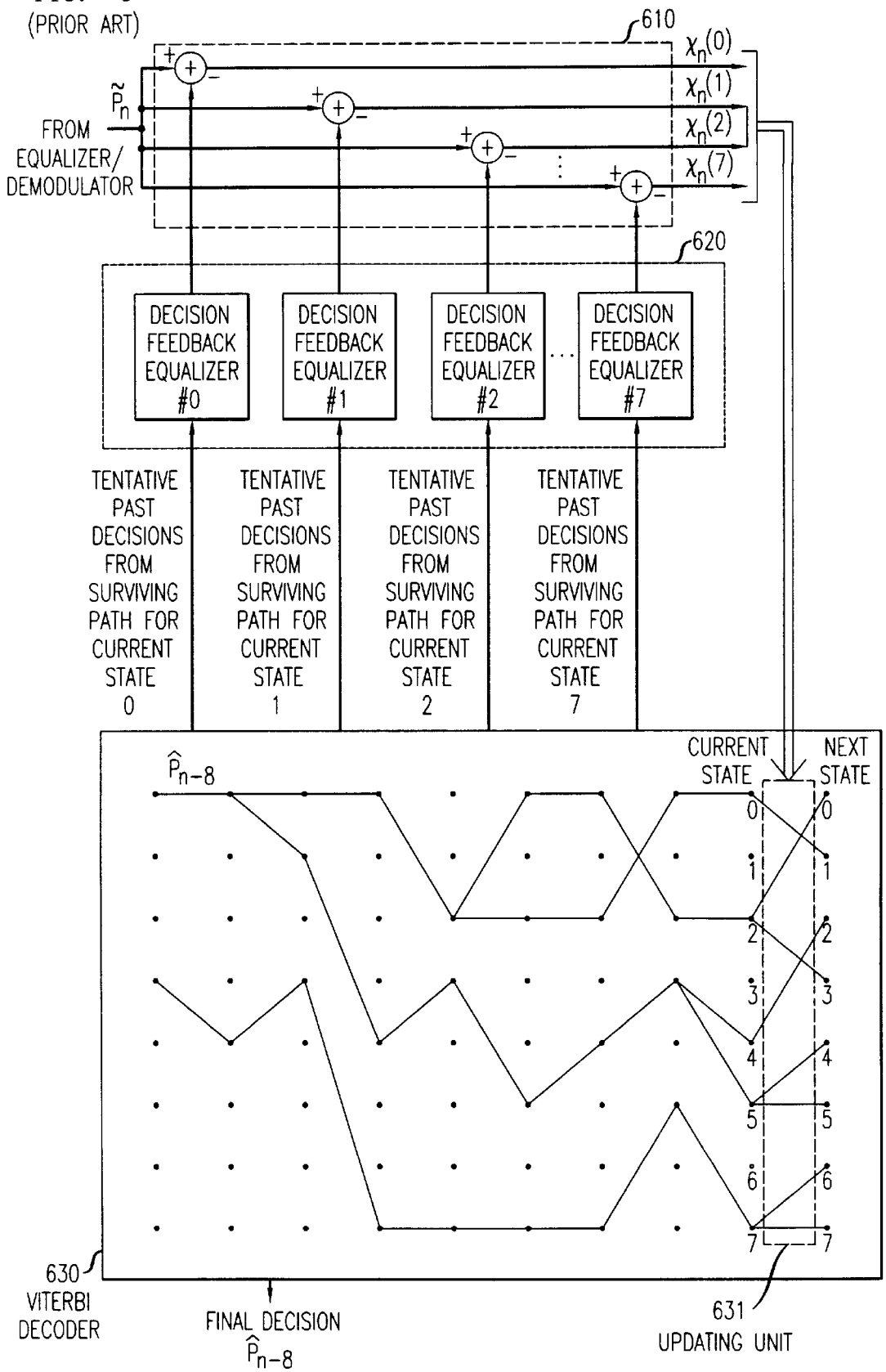
FIG. 6 provides a functional view, at a particular point in time, of a prior art approach to a joint DFE/decoder.

FIG. 6 in particular shows the prior art approach to a joint DFE/decoder as disclosed, for example, in the above cited '117 patent.

In the arrangement of FIG. 6, eight replicas of $\tilde{P}_n$ are formed and a respective estimated intersymbol interference, or ISI, component is subtracted from each replica by a respective one of adders 610, to produce equalized signals $x_n^{(0)}$ through $x_n^{(7)}$. The ISI components are provided by respective ones of decision feedback equalizers 620, as described below.

Viterbi decoder 630 of the DFE/decoder receives the equalized signals $X_n^{(0)}$ through $x_n^{(7)}$ and provides final decision $\hat{P}_{n-8}$ as to the value of a signal point received D=8 signaling intervals ago. The so-called decoding depth of "8" is used herein for purposes of illustration. In actual practice, the decoding depth depends on the code that is being used and will typically be greater than 8.

The representation of Viterbi decoder 630 in FIG. 6 includes a representation of the trellis for the eight-state code in question and further shows the so-called surviving paths extending through the trellis, each surviving path being associated with, and terminating on, one of the eight states of the code, denominated 0, 1, . . . , and 7. The task of the Viterbi decoder is to determine what the most likely sequence of signal points actually was, and central to that task in the prior art is to determine the most likely sequence of transmitted signal points leading into each state of the code at any point in time. These are the aforementioned surviving paths, and the signal points along each path constitute a sequence of tentative signal point decisions. A metric is maintained for each surviving path and, as described below, the current equalized signals $x_n^{(0)}$ through $x_n^{(7)}$ are used to determine new surviving paths having updated path metrics. A final decision is thereupon made as to the value of one of the received signal points—specifically one that was received (in this case) 8 signaling intervals earlier. Typically, the path having the smallest metric at this time—called the very best surviving path—is identified. The signal point on that path 8 signaling intervals earlier is taken as the final signal point decision.

Each of DFEs 620 is associated with a particular one of the code states 0, 1, . . . , and 7. In particular, each DFE generates its aforementioned respective estimated ISI component, or ISI estimate, as a function of the tentative signal point decisions which lie along the surviving path leading to the code state associated with that DFE. At this time, the ensemble of tentative signal point decisions along each newly determined surviving path is applied to the associated DFE in preparation for the generation of ISI estimates to be applied to adders 610. In particular, as is well known, a DFE forms its ISI estimate by forming a combination (illustratively a linear combination) of the decisions that have been input to it using an ensemble of coefficients whose values typically are adaptively updated. Thus it will be seen that each of the equalized signals $x_n^{(0)}$ through $x_n^{(7)}$ is associated with a particular state of the code in that the ISI estimate that was used to form that equalized signal was generated as a function of the then surviving path leading to the state in question.

Figure 7:
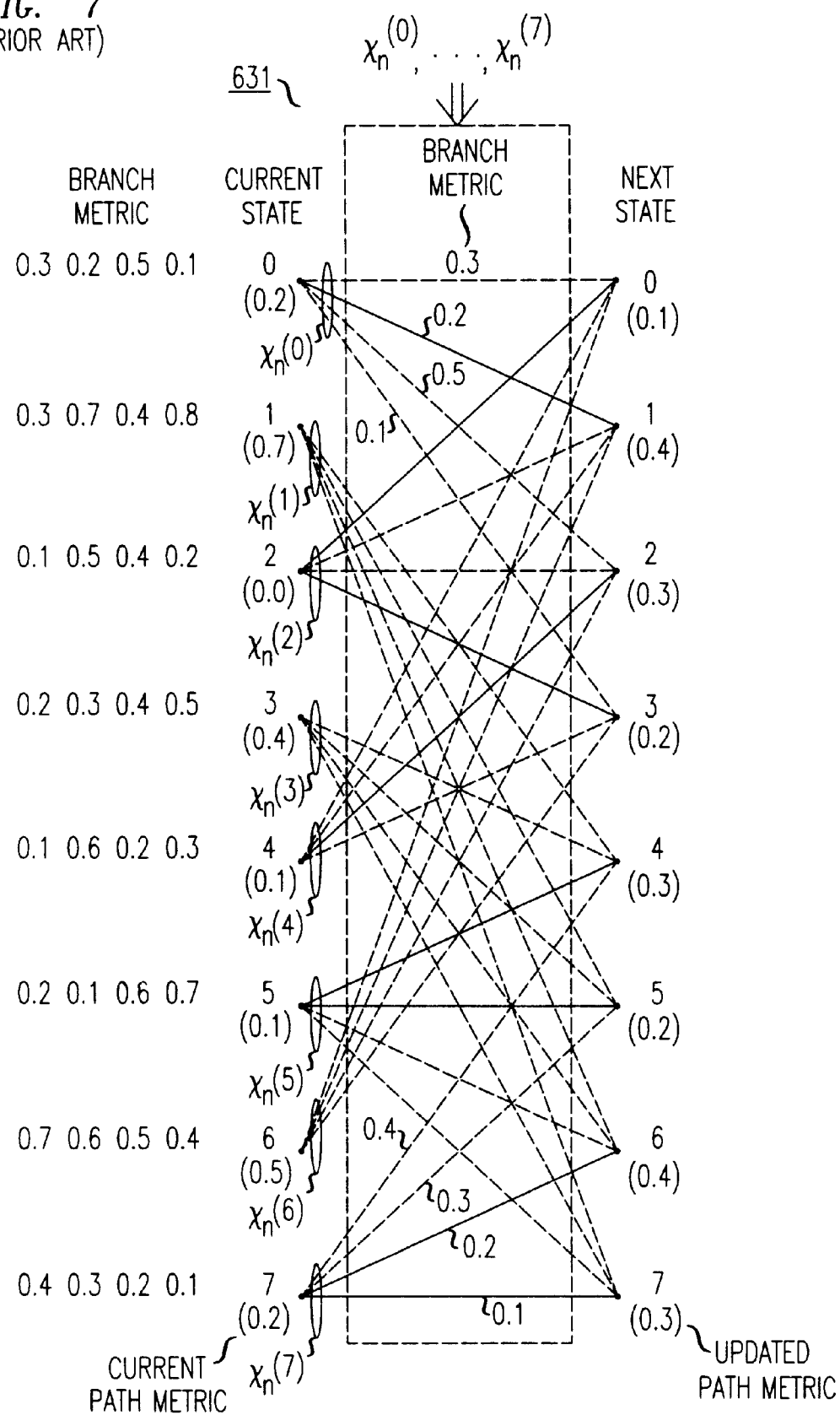
FIG. 7 shows a trellis diagram illustratively used in the DFE/decoder of FIG. 6.

The process by which, as mentioned above, the current equalized signals $x_n^{(0)}$ through $x_n^{(7)}$ are used to determine new surviving paths having updated path metrics is carried out by updating unit 631 within Viterbi decoder 630. FIG. 7 shows the trellis diagram for the eight-state code used in this prior art example. The solid and dashed lines both constitute branches of the trellis diagram as will be apparent as this description continues.

At this point, the Viterbi decoding process proceeds to calculate so-called branch metrics for each of the (in this case) thirty-two current-to-next-state branches of the trellis diagram. The branch metric for each branch is given by the squared Euclidean distance between one of the equalized signals $X_n^{(0)}$ through $x_n^{(7)}$ and the closest signal point in the subset associated with that branch. As shown in FIG. 7 illustrative values of the thirty-two branch metrics are 0.3, 0.2, 0.5, 0.1, . . . , 0.4, 0.3, 0.2 and 0.1. The particular one of the equalized signals $x_n^{(0)}$ through $x_n^{(7)}$ that is used to calculate any given one of the branch metrics is the equalized signal associated with the state from which that branch emanates. Thus as shown in the FIG., equalized signal $x_n^{(0)}$ is used in calculating the branch metrics for the branches between current state 0 and next states 0, 1, 2, and 3; $x_n^{(1)}$ is used in calculating the branch metrics for the branches between current state 1 and next states 4, 5, 6, and 7; and so on. There are thirty-two candidate paths at this point, four leading into each of the eight next states. Each candidate path has an associated metric given by the sum of the current path metric of the corresponding current state and the branch metric of the corresponding branch, the eight current path metrics illustratively being 0.2, 0.7, 0.0, 0.4, 0.1, 0.1, 0.5, and 0.2. The one of those four candidate paths having the smallest path metric is declared the new surviving path for that state and the corresponding path metric becomes the new path metric for that state. For example, the candidate paths leading into next state 0 from current states 0, 2, 4, and 6 have metrics of 0.5 (0.2+0.3), 0.1 (0.0+0.1), 0.2 (0.1+0.1) and 1.2 (0.5+0.7), respectively, so that the second candidate path becomes the surviving path into next state 0. The branches shown in solid line within updating unit 631 are the branches of the new surviving paths. (As is well known, normalization or other techniques may be used at this point to prevent the values of the path metrics from becoming so large as to possibly cause register overflow. However, the new path metrics shown in FIG. 7 are the pre-normalized values.)

At this point the very best surviving path is that leading into state 0, it being the path with the smallest new path metric. The aforementioned final decision $\hat{P}_{n-8}$ is now output, it being the signal point on that very best surviving path from 8 signaling intervals earlier.

We are now in a position to understand the principles of the present invention. It will be appreciated from the foregoing that the ISI estimate generated by each DFE is a function of a respective surviving path through the trellis. As a result, each of the ISI-compensated signals $x_n^{(0)}$ through $x_n^{(7)}$ is also a function of some surviving path. The branch metrics, in turn, are a function of the ISI-compensated signals. Ultimately then, the branch metric for branches which extend from any given path are themselves a function of the path itself—actually the tentative decisions along that path. This all being so, I have come to recognize that of the two or more paths leading into a state, the path that has the smallest metric at a particular point in time may ultimately not have the smallest path metric once extended because the branch metrics for each branch—even though extending from the same state—are path-dependent and therefore different. Thus suppose, for example, that the four candidate paths entering state 0 have associated path metrics 0.5, 0.1, 0.2 and 1.2, respectively. The prior art approach declares the second path the survivor and discards the remaining. However, assume further that the smallest branch metric for a particular branch extending from state 0 is 0.3 when computing the branch metric to extend the second path and 0.1 when computing the branch metric to extend the third path. (Again, the difference is a consequence of the fact that the ISI component calculation is itself path-dependent.) Thus the extended second and third paths would have path metrics of 0.4 and 0.3, respectively, so that it now appears that the third path—not any longer the second path—is the correct one. The prior art approach to identifying surviving paths, however, would never admit of such a possibility because, as just noted, the third path would have been already discarded.

The above discussion is illustrative of the more general observation that when a branch metric used to compute an extended path metric is a function of the path being extended, it is possible that a path leading into a state which was not the surviving path (in prior art terms) can nonetheless become a path with a lower path metric once the path has been extended from that state.

The present invention takes advantage of this observation. In accordance with the invention, new surviving paths are some number of M (M>1) paths having the smallest path metrics, regardless of what state they are entering. Thus any number of the candidate paths coming into a state can be surviving paths, depending on the values of their path metrics relative to all other candidate paths.

Figure 8:
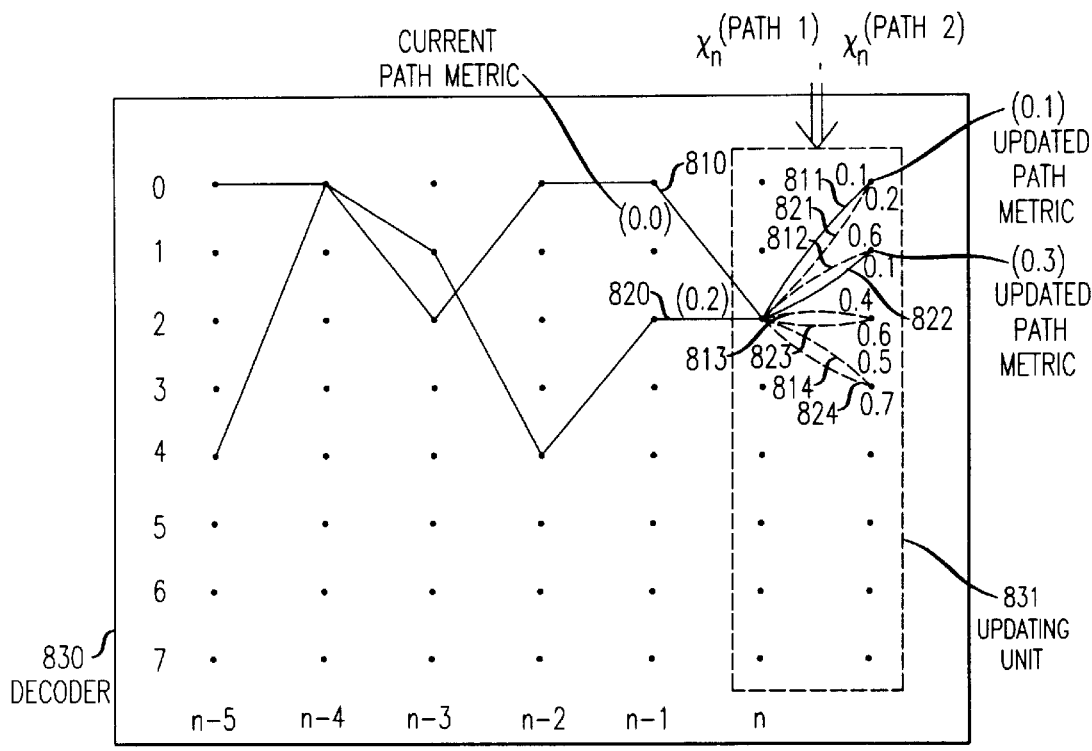
FIG. 8 shows an illustrative embodiment for the decoder portion of the joint DFE/decoder of FIG. 1 that embodies the principles of the invention.

FIG. 8 shows a representation of the decoder portion 830 of decoder 202 (FIG. 1) embodying the principles of the invention. As noted earlier, the present illustrative embodiment utilizes the eight-state trellis diagram of FIG. 4. In this example, the value of M is 2, that is, only two paths through the trellis are retained as surviving paths for each cycle of the decoder. Note that in two cases the M=2 surviving paths were paths entering a particular one state—state 0 at the $(n-5)^{th}$ signaling interval and state 2 at the $(n-1)^{st}$ signaling interval.

Also shown in the FIG. is updating unit 831 which computes branch metrics and updated path metrics in the manner described above vis-à-vis FIG. 7. Updating unit 831 receives M=2 ISI-compensated versions of received signal point $\tilde{P}_n$, denoted $x_n^{(Path1)}$ and $x_n^{(Path2)}$. These are generated by respective DFEs (not shown) as in FIG. 6. The notation of the superscripts, Path1 and Path2, is used to emphasize the point that each ISI-compensated version of the received signal is associated with a different surviving path even if two or more paths enter the same state.

The two paths entering state 2 at the $(n-1)^{st}$ signaling interval are denoted 810 and 820. Updating unit 831 must now consider eight candidate paths. Four of those paths are extensions of path 810 out of state 2 and transitioning to states 0, 1, 2, and 3 via branches 811, 812, 813, and 814 respectively, consistent with the trellis diagram of FIG. 4. The other four paths are extensions of path 820 also out of state 2 and transitioning to the same states 0, 1, 2, and 3 via branches 821, 822, 823, and 824 respectively. It is assumed that when the branch metrics for branches 811, 812, 813, and 814 were computed, utilizing $x_n^{(Path1)}$ as the ISI-compensated signal, the computed values were 0.1, 0.6, 0.4, and 0.5, respectively. Similarly, when the branch metrics for branches 821, 822, 823, and 824 were computed, utilizing $x_n^{(Path2)}$ as the ISI-compensated signal, the computed values were 0.2, 0.1, 0.6, and 0.7, respectively. Paths 810 and 820 illustratively have respective path metrics of 0.0 and 0.2. Thus, the path metrics of the eight candidate paths, reading from top to bottom in the FIG., are 0.1, 0.4, 0.6, 0.3, 0.4, 0.8, 0.5, and 0.9, respectively. The M=2 paths having the smallest path metrics are thus path 810 extended along branch 811 and path 820 extended along branch 822 since those two extended paths have the two smallest path metrics 0.1 and 0.3. It will be appreciated that if the branch metrics had been different, it is possible that both surviving paths might have been extensions of either path 810 or 820. Moreover, it is possible that both surviving paths, rather than terminating on different states—in this case, states 0 and 1—might have terminated on the same state.

Figure 9:
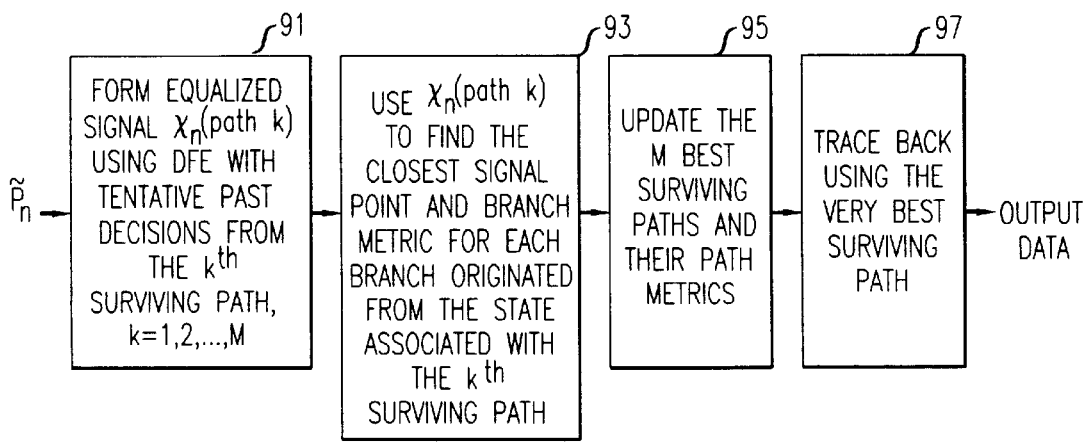
FIG. 9 is a combined block diagram/functional description view of the DFE/decoder of FIG. 1 which incorporates the decoder of FIG. 8.

FIG. 9 provides a combined block diagram/functional description view of the DFE/decoder 202 which incorporates the decoder of FIG. 8. Received signal point $\tilde{P}_n$ is processed at block 91 to produce an equalized signal associated with each of the M surviving paths. That is, an equalized signal $x_n^{(Path\ k)}$ is formed using a DFE whose inputs are the tentative past decisions along the $k^{th}$ surviving path, k being 1, 2, 3, . . . , or M.

At block 93 equalized signal $x_n^{(Path\ k)}$ is used to find: a) the closest signal point in the subset associated with each branch, and b) the branch metric for each branch emanating from the state associated with the $k^{th}$ surviving path. Then, at block 95, a new set of M best surviving paths are identified, along with their path metrics. The one of the M surviving paths having the smallest metric at this time—called the very best surviving path—is identified. At block 97, tracing back along the very best surviving path, data corresponding to the aforementioned final decision $\hat{P}_{n-D}$ as to the value of a signal point transmitted D signal points earlier is output.

Figure 10:
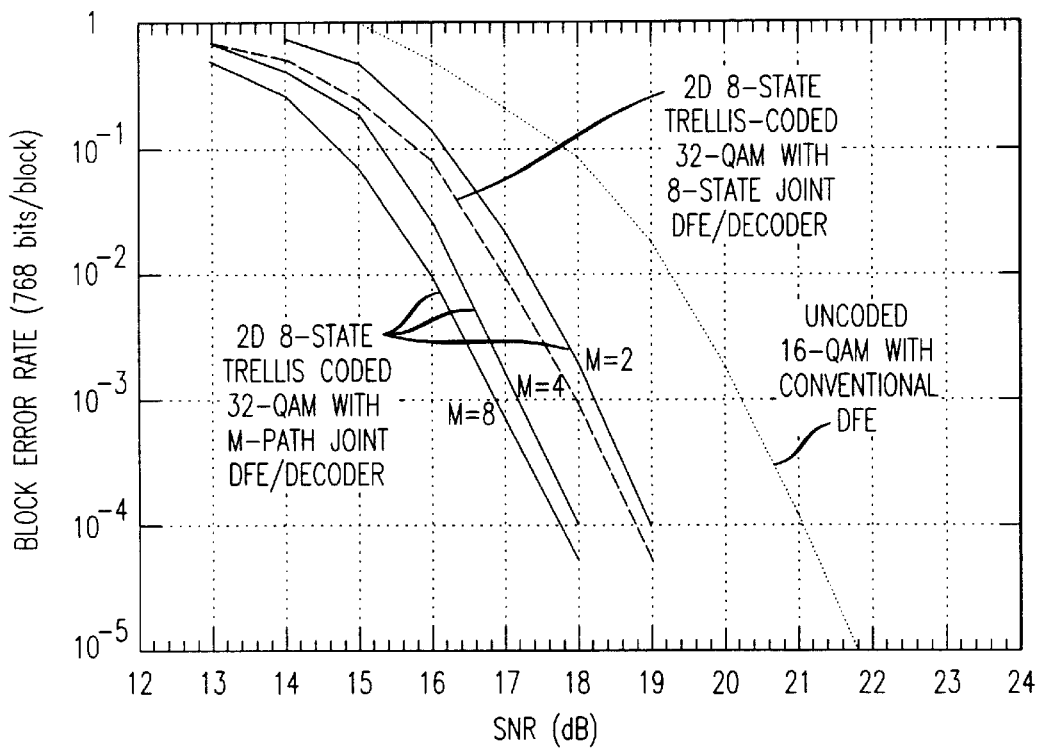
FIGS. 10–11 show the performance for two different ISI channels of two-dimensional trellis-coded modulation with the M-Path Joint DFE/Decoder embodying the principles of the present invention as opposed to prior art approaches.

Experiments have shown that, advantageously, the path-oriented approach of the present invention, when used in applications in which the branch metrics are a function of the path from which the branch emanates, provides a higher level of error rate performance than prior art arrangements for a given level of implementational complexity. In particular, the performance of the M-path joint DFE/decoder disclosed herein using the two-dimensional 8-state trellis-coded 32-signal point coded modulation of the illustrative embodiment is shown in FIG. 10 for a particular ISI channel. In this figure, block error rate curves further to the left represent improved error rate performance. It may be observed that, using the present invention with M=2 provides slightly worse error rate performance than the prior art approach disclosed in the '117 patent. However, the latter, since it requires 8 DFEs—one for each of the eight states—is implementationally much more complex than the former. Using the present invention with M=4 provides markedly higher error rate performance than the arrangement of the '117 patent while still featuring less complexity. And for comparable level of complexity, when M=8, the improvement is even more dramatic.

Figure 11:
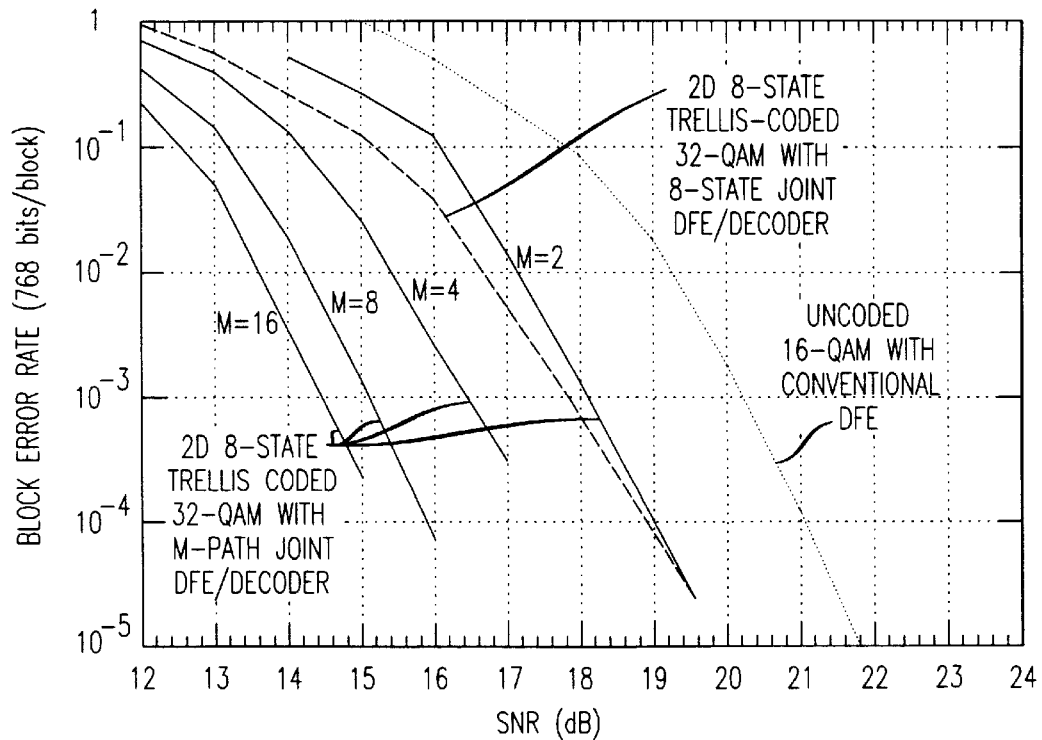

FIG. 11 shows a similar effect for a different ISI channel. It may be noticed that the experiments for that channel included the case of M=16, this being an embodiment of the invention in which the number of paths retained as surviving paths is greater than the number of states.

The foregoing merely illustrates the invention. Thus, for example, it will be appreciated by those skilled in the art that the diagrams herein represent conceptual views of illustrative circuitry embodying the principles of the invention. The functions of the various elements shown in the FIGS. would, in preferred embodiments, be implemented by one or more programmed processors, digital signal processing (DSP) chips, or the like rather than individual hardware elements.

In the claims hereof any element expressed as a means for performing a specified function is intended to encompass any way of performing that function including, for example, a) a combination of circuit elements which performs that function or b) software in any form (including, therefore, firmware, microcode or the like) combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

It will be appreciated that those skilled in the art will be able to devise various arrangements which, although not explicitly shown or described herein, embody the principles of the invention and thus are within its spirit and scope.

I claim:

1. A method for use in a decoder for decoding a sequence of signal points corrupted by intersymbol interference, said signal points having been generated using a particular trellis code defined by a trellis diagram, the method comprising the steps of a) generating in response to each received signal point a plurality of equalized signal points, each equalized signal point being generated as a function of a respective estimate of the intersymbol interference component of said each received signal point, each estimate being a function of a respective present surviving path of said decoder, b) generating a path metric for each of a plurality of candidate paths, each candidate path comprising a respective one of the present surviving paths extended from its respective terminating state of the trellis code along a branch of said trellis diagram, said generated path metrics being a function of said generated equalized signal points, c) selecting ones of the candidate paths to be updated surviving paths, said selected ones of the candidate paths having the smallest overall path metrics relative to all candidate paths, d) forming a decision as to a particular one of the signal points of said sequence as a function of at least one of the candidate paths.

2. The method of claim 1 wherein in step a) said each estimate is formed by a decision feedback equalizer which utilizes as its input decisions tentative decisions as to the values of said sequence of signal points which lie along the respective present surviving path.

3. The method of claim 1 wherein in step b) each said generated path metric for one of said candidate paths is based on an existing path metric for said respective present surviving path and a branch metric associated with said respective branch of said candidate path, said branch metric being a function of at least one said generated equalized signal point.

4. The method of claim 3 wherein each of the branches of said trellis diagram is associated with a respective subset of signal points of a signal constellation and wherein in step b) each said branch metric is a function of the distance between each said equalized signal point and the closest signal point in the subset associated with each said particular branch.

5. The method of claim 1 wherein in step d) said one of the candidate paths is an updated surviving path.

6. In a method for use in a decoder wherein surviving paths are determined as a function of path metrics associated with respective candidate paths, the improvement comprising:

retaining as surviving paths a number of said candidate paths having the smallest overall path metrics relative to all of said candidate paths.

7. The invention of claim 6 comprising the further step of receiving a succession of signal points, said path metrics being determined as a function of said received signal points, and wherein said retaining is performed for each received signal point.

8. The invention of claim 7 wherein each said candidate path includes a respective one of current surviving paths and each of said path metrics associated with said candidate paths is a function of the sum of a) the path metric associated with said respective current surviving path and b) a branch metric associated with a respective branch extending said respective current surviving path, each of said branch metrics being a function of one of said received signal points and of said respective current surviving path.

9. The invention of claim 6 wherein said retaining step is performed for each of a succession of iterations of said decoder.

10. The invention of claim 6 wherein said decoder operates on a received version of transmitted signal points, said signal points having been generated using a predetermined code defined by a trellis, said trellis having a plurality of states.

11. The invention of claim 10 wherein said candidate paths being retained as surviving paths are selected independent of whether more than one of said candidate paths enter the same state.

12. The invention of claim 6 further comprising receiving a succession of signal points, and forming a decision as to the value of a previously received one of said signal points as a function of at least one of said candidate paths.

13. The invention of claim 12 wherein said one of said candidate paths is a surviving path.

14. A method for decoding a stream of signal points, said signal points having been generated using a predetermined trellis code defined by a state transition diagram, said method comprising the steps of a) maintaining a path metric associated with each of a plurality of surviving paths through the code trellis, each of said surviving paths terminating on a particular state of the code, b) responsive to a received one of said signal points, generating an updated path metric for each of a plurality of candidate paths, each candidate path comprising a respective one of the surviving paths extended from that surviving path's terminating state along a branch of said trellis, c) identifying those M candidate paths having the smallest overall updated path metrics relative to all candidate paths as new surviving paths, M being an integer, and d) forming a decision as to the value of a previously received one of said signal points as a function of at least one of said candidate paths.

15. The invention of claim 14 wherein in step d) one of said candidate paths is one of said new surviving paths.

16. The invention of claim 14 wherein in step b) each of said updated path metrics for said candidate paths is a function of a branch metric associated with said branch along which the respective surviving path is extended, each of said branch metrics being a function of the respective surviving path.

17. The invention of claim 16 wherein each of the branches of the trellis is associated with a respective subset of signal points of a signal constellation and wherein each said branch metric is further a function of the distance between each said received signal point and the subset associated with each said particular branch.

18. The invention of claim 14 wherein step b) further comprises generating at least one version of the received signal point, each of said versions being a function of a particular surviving path, and each of said updated path metrics of respective extended surviving paths being functions of at least one of said generated versions.

19. The invention of claim 18 wherein each of said generated versions is formed by a decision feedback equalizer which utilizes as its input decisions tentative decisions as to the values of said stream of signal points which lie along the respective particular surviving path.

20. Apparatus comprising means for receiving signal points having been generated using a code characterized by a trellis, said trellis having a plurality of states and paths, and means for determining a path metric associated with every path entering a state and for retaining a number of surviving paths, said surviving paths being ones of said paths associated with the smallest overall path metrics relative to all of said paths.

21. A method for use in a decoder for each of a plurality of received signals which was encoded with a trellis code, said decoder maintaining a plurality of surviving paths through the trellis of said trellis code, each of said surviving paths having an associated path metric, comprising the steps of utilizing a value of each said received signal to generate at least one extended version of said surviving paths through said trellis and to update the path metric for each said extended version, and retaining as new surviving paths ones of said extended versions, said new surviving paths being those ones of said extended versions with the smallest overall path metrics relative to all of said extended versions.

22. The invention of claim 21 wherein each of said updated path metrics is a function of said respective surviving path from which extended version is generated.

23. A method for use in a decoder comprising a) receiving a stream of signal points, said signal points having been generated using a trellis code, b) responsive to each received signal point, computing a branch metric for at least ones of the branches associated with a transition from a current state to a next state of said code, c) computing a path metric at said next state for each of a plurality of paths through said trellis, each said path including a respective one of said branches, said path metric being a function of said branch metric for said respective included branch, said branch metric being a function of said received signal point and of a portion of said path which includes said respective branch, said portion of said path terminating at said current state, d) retaining ones of said paths which include said branches as surviving paths, said surviving paths having the smallest overall path metrics relative to all of said paths, and e) forming a decision as to an individual one of said signal points as a function of at least a particular one of said paths which include said branches.

24. The invention of claim 23 wherein in step e) said particular one of said paths which include said branches is one of said surviving paths.

* * * * *